United States Patent [19]

Beery

[11] 4,366,219
[45] Dec. 28, 1982

[54] SCANNING OPTICS COPIER WITH VARIABLE PITCH COPY CAPABILITY

[75] Inventor: Jack Beery, Fairport, N.Y.

[73] Assignee: Xerox Corporation, Stamford, Conn.

[21] Appl. No.: 223,512

[22] Filed: Jan. 8, 1981

[51] Int. Cl.³ .................. G03G 15/00; G03B 27/32
[52] U.S. Cl. .................................... 430/31; 355/8;
                                                355/14 SH; 355/77
[58] Field of Search ......... 355/8, 14 R, 3 SH, 14 SH,
                                                355/77; 430/31

[56] References Cited
U.S. PATENT DOCUMENTS

| | | | |
|---|---|---|---|
| 3,888,579 | 6/1975 | Rodek et al. | 355/14 |
| 3,944,360 | 3/1976 | Deetz et al. | 355/14 |
| 3,989,369 | 11/1976 | Namba | 355/8 |
| 4,211,482 | 7/1980 | Arai et al. | 355/8 |
| 4,236,808 | 12/1980 | Tusso et al. | 355/8 |
| 4,270,857 | 6/1981 | Komori et al. | 355/8 |

OTHER PUBLICATIONS

U.S. Ser. No. 80,624 (D/78040), "Open Loop Controller".

Primary Examiner—R. L. Moses
Attorney, Agent, or Firm—Ronald F. Chapuran

[57] ABSTRACT

The present invention is a reproduction machine having a scanning device for projecting images of documents onto a moving photosensitive surface wherein the control of the reproduction machine is a function of the size of the copy sheets. The copy sheets are fed from a copy sheet supply into communication with a registration switch to determine the length of the copy sheet. A counter responsive to the switch converts the length of the copy sheet into a scan drive signal. The scan drive signal is used to terminate the scan drive in accordance with the length of the copy sheet.

1 Claim, 6 Drawing Figures

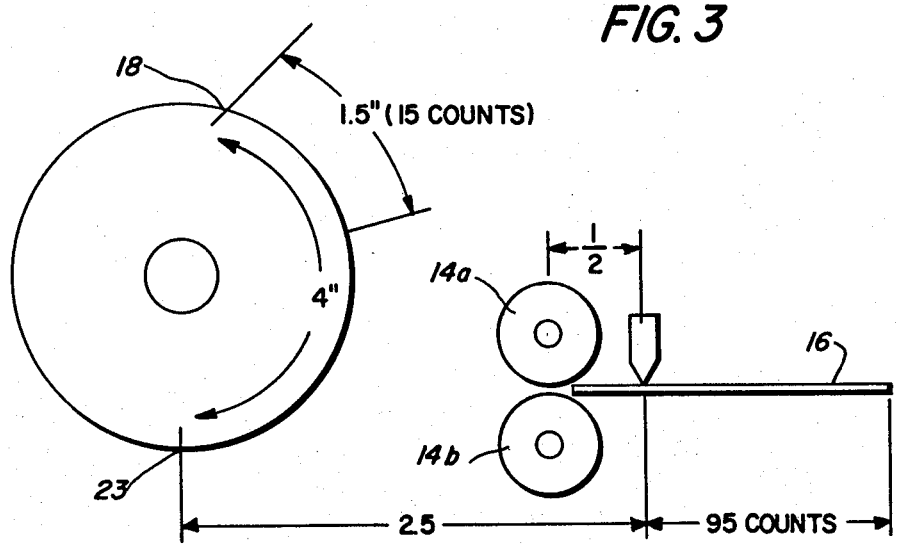

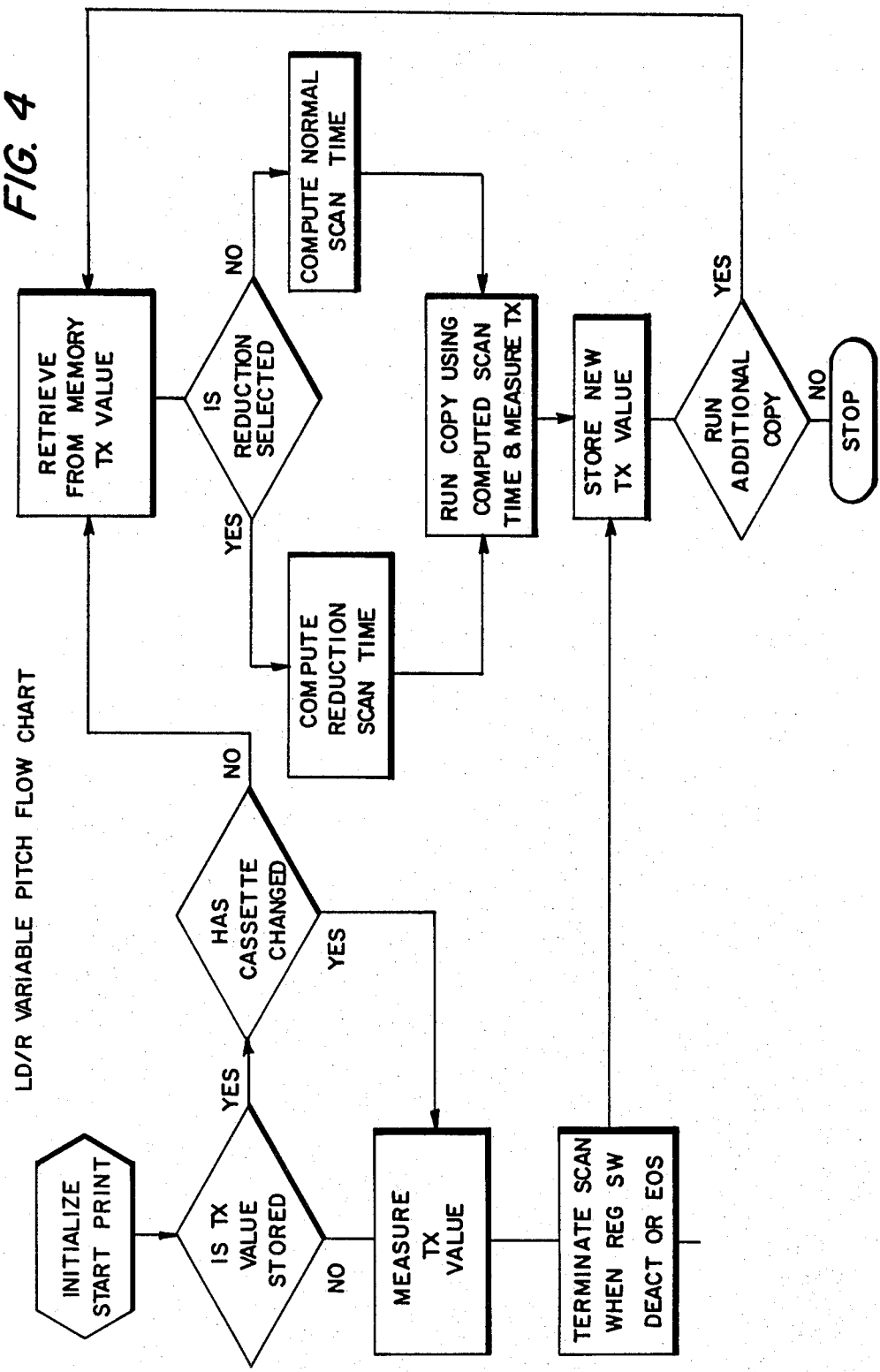

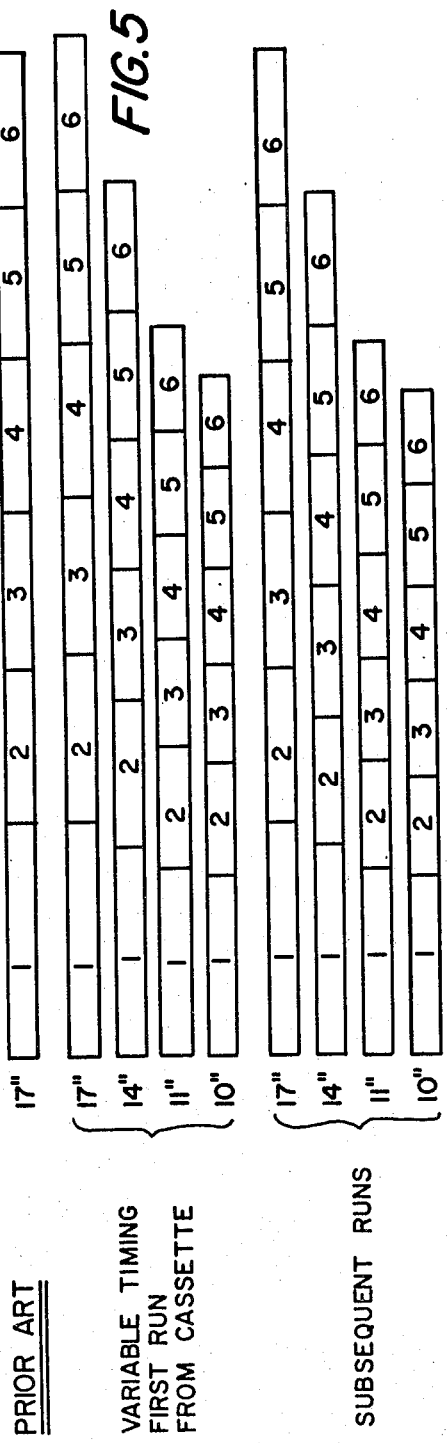
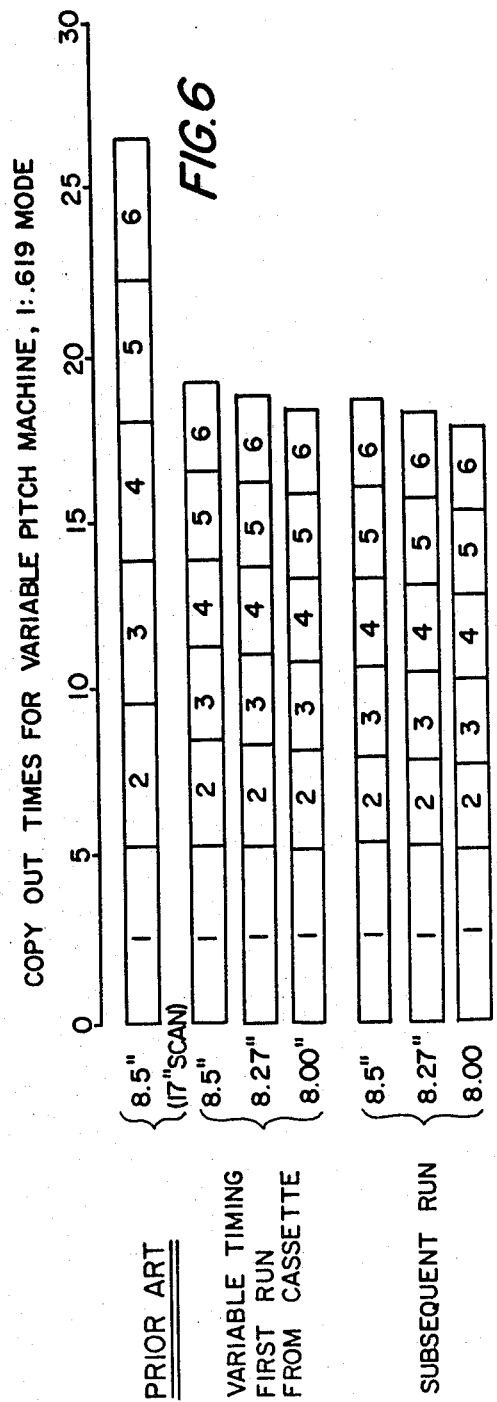

SCANNING OPTICS COPIER WITH VARIABLE PITCH COPY CAPABILITY

This invention relates to control systems for reproduction machines and, in particular, to the timing control in response to different size copy sheets in order to improve the machine efficiency.

Often times, in prior art machines, the timing of the machine is fixed on the pitch (copy cycle) based on the largest copy sheet to be fed from a given tray. When smaller copy sheets are fed from a given tray, time and throughput are wasted on the increased distance between copies.

In other prior art machines, a multiplicity of copy paper sizes fed from different trays at selected pitches such as for 8.5 and 17 inch copy paper have been used. In these machines it is necessary to have the necessary additional switches and control circuitry to control the timing of the machine based upon the copy sheet size being fed.

In other prior art devices such as in U.S. Pat. No. 3,944,360, there is shown the calculation of timing information in response to programmed instructions. U.S. Pat. No. 3,888,579 teaches a digital controlled document feeder in which the lead edge of a document is detected and compared to the frame position of the photoreceptor. The document sheet is then accelerated or retarded relative to its normal feed velocity to properly coordinate the document to an appropriate pitch frame on the photoreceptor. These references, however, do not consider the problem of an optical scanning system and the need to time the scanning system relative to the size of the copy sheet being fed from a copy sheet feed tray.

In an optical scan system wherein the optical system scans a stationary document to project an image onto a moving photosensitive surface, the time to rescan or to bring the scanning carriage back to start position is generally lost time. It would be desirable, therefore, to control the space from the trail edge of a first copy sheet to the lead edge of the second copy sheet such that the distance between the trail edge and the lead edge is the lost time of the system needed for rescan.

It is therefore an object of the present invention to provide a new and improved timing control responsive to copy sheet size in an optic scanning reproduction system in which the length of the copy sheet is a function of the time that the copy sheet holds a registration switch in an actuated position.

Briefly, the present invention is concerned with a reproduction machine having a scanning device for projecting images of documents onto a moving photosensitive surface wherein the control of the reproduction machine is a function of the size of the copy sheets. The copy sheets are fed from a copy sheet supply into communication with a registration switch to determine the length of the copy sheet. A counter converts the length of the copy sheet into a scan drive signal that is used to terminate the scan drive in accordance with the length of the copy sheet.

BRIEF DESCRIPTION OF THE DRAWINGS

Other objects and advantages of the present invention will become apparent upon reading the following detailed description and upon reference to the drawings wherein the same reference numerals have been applied to like parts and wherein:

FIG. 3 is a detailed illustration of the registration station and photoconductor drum in accordance with the present invention.

FIG. 4 is a flow chart illustrating the scanning and registration timing in accordance with the present invention.

FIGS. 5 and 6 illustrate the improved timing in accordance with the procedure shown in FIG. 4.

DESCRIPTION OF THE INVENTION

Figure 1:
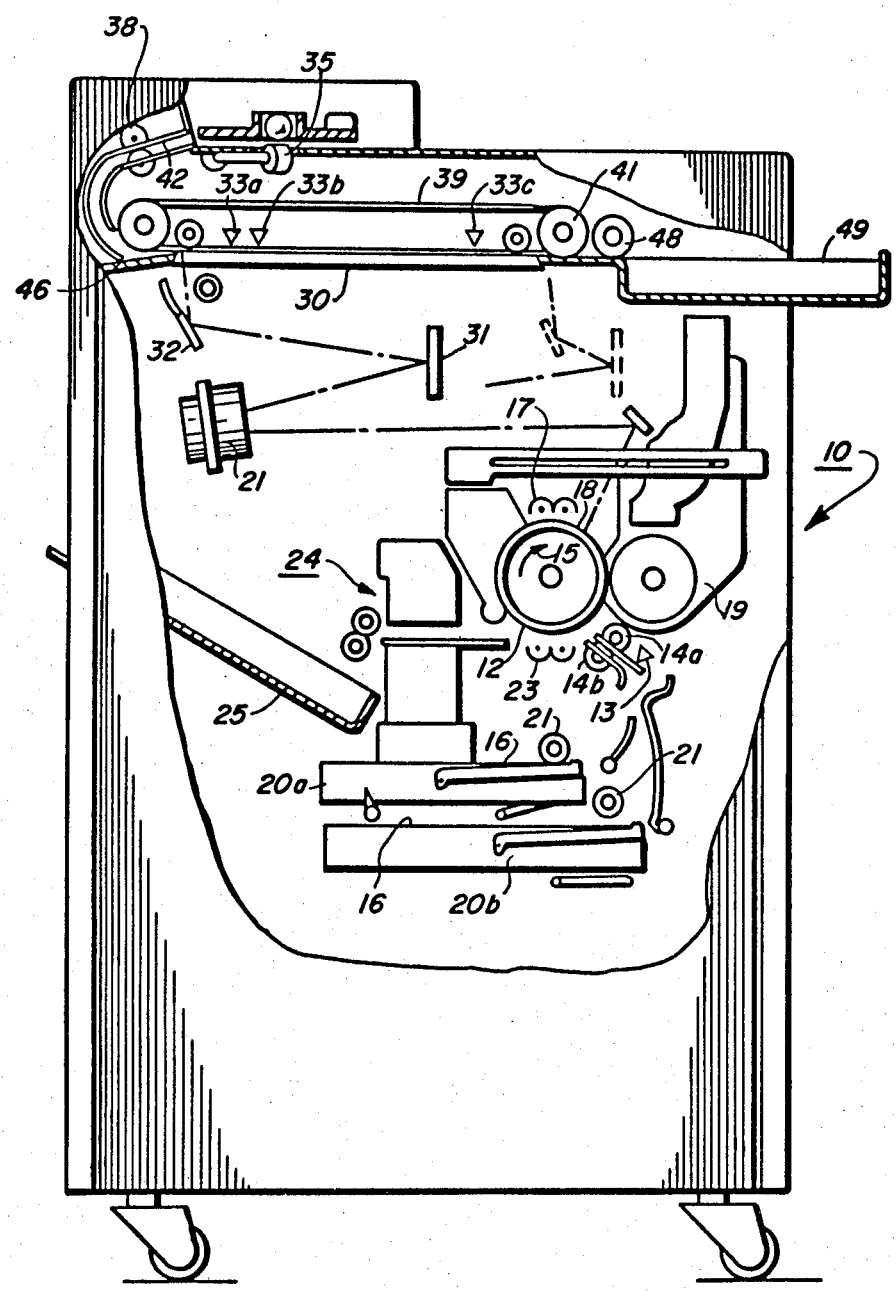
FIG. 1 is a representation of a reproducing apparatus incorporating the present invention.

Referring now to FIG. 1, there is shown by way of example an automatic xerographic reproducing machine 10 including an image recording drum-like member 12, it's outer periphery coated with a suitable photoconductive surface.

The drum 12 moves the photoconductive surface in the direction of arrow 15 through a charging station 17 providing an electrostatic charge uniformly over the photoconductive surface. Thereafter, the drum 12 is rotated to exposure station 18 and the charged photoconductive surface is exposed to a light image of the original document to be reproduced. The charge is selectively dissipated in the light exposed regions to record the original document in the form of an electrostatic latent image. After exposure drum 12 rotates the electrostatic latent image recorded on the photoconductive surface to development station 19 wherein a conventional developer mix is applied to the photoconductive surface of the drum 12 rendering the latent image visible.

Copy sheets 16 of the final support material are supported in a stack arrangement on either elevating stack main tray 20a or auxiliary tray 20b. With the stack at its elevated position, a sheet separator 21 feeds individual sheets therefrom to a registration system. The registration system includes registration switch 13 and registration rolls 14a and 14b. A copy sheet 16 is registered in the nip of register rolls 14a and 14b.

The sheet is then forwarded to the transfer station in proper registration with the image on the drum 12. The developed image on the photoconductive surface is brought into contact with a copy sheet 16 and the toner image is transferred from the photoconductive surface to the contacting side of the copy sheet 16. Following transfer of the image the final support material is transported through a detack station where detack corotron 23 uniformly charges the support material to separate it from the drum 12.

The copy sheet 16 is then advanced to a suitable fusing station 24 for coalescing the transferred powder image to the support material. After the fusing process, the copy sheet 16 is advanced to a suitable output device such as tray 25.

The original document to be reproduced is placed image side down upon a horizontal transparent plate 30 and scanned by means of a moving optical system. The scanning system includes a stationary lens 21 and a pair of cooperating movable scanning mirrors, half rate mirror 31 and full rate mirror 32 supported upon carriages not illustrated. Disposed along the platen 30 are a start of scan switch 33a for 1:1 magnification ratio, a start of scan switch 33b for a reduction ratio, and an end of scan switch 33c.

A document handler is also provided including a registration assist roll 35 activated when a document is inserted. Pinch rolls 38 are activated to feed the document about 180 degree curved guides 42. The document is driven onto the platen 30 by a platen belt transport 39. After copying, the platen transport 39 is activated and the document is driven off the platen by the output pinch roll 48 into the document catch tray 49.

Figure 2:
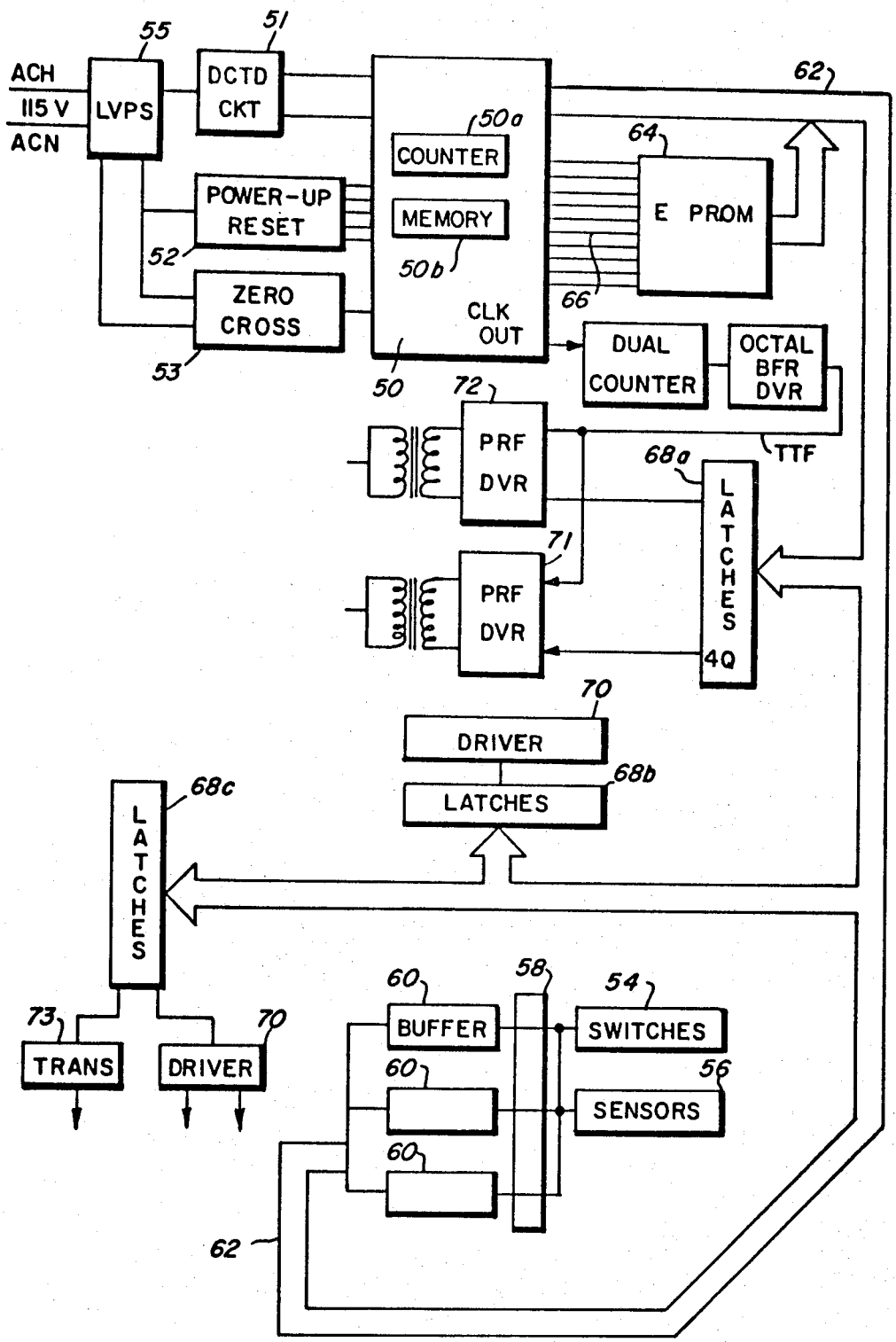
FIG. 2, is a block diagram illustration of a controller of the reproducing apparatus as shown in FIG. 1.

With reference to FIG. 2, there is shown a controller including microprocessor 50 with counter 50a and memory 50b, and dedicated circuitry 51 connected to the reproduction machine. The reproduction machine has a low voltage power supply 55 connected to the dedicted circuitry 51 and an input line voltage source, preferably 115 volts alternating current. The reproduction machine also includes other, not shown, power supplies and distribution circuitry. A bidirectional bus 62 interconnects the microprocessor 50 and the reproduction machine and generally conveys signals from sensors 56 and switches 54 of the reproduction machine to microprocessor 50 and conveys control signals from microprocessor 50 to the reproduction machine.

The signals of various reproduction machine switches 54 and sensors 56 are conveyed through a resistance network 58 and suitable buffers 60 to the 8 bit external data bus 62 connected to microprocessor 50. The 8 bit data bus 62 is also connected to a suitable memory device such as EPROM 64 interconnected to microprocessor 50 through suitable address lines 66. It should be noted that the EPROM device 64 can be replaced by a suitable read only memory ROM internal to the microprocessor 50.

Outputs to the reproduction machine controlled elements are conveyed from the microprocessor 50 along the external data bus 62 to various latches 68a, 68b and 68c. The latches are interconnected to various drivers 70, 71 and 72, or transistors 73 to activate various clutches, solenoids, motor drives, triacs and power supplies in the reproduction machine. For a more detailed description of the control, reference is made to copending U.S. Ser. No. 80,624 entitled "Open Loop Controller" and U.S. Ser. No. 111,048, entitled "Fuser Control" incorporated herein.

With reference to FIG. 3 there is shown the paper feed registration switch 13 activated by a copy sheet 16 as it passes from the paper feed tray 20a or 20b to the registration rolls, 14a, 14b. The roll 14a is the driving roll engaged by roll 14b to form a nip receiving the lead edge of the copy sheet 16. The copy sheet 16 extends from the nip of the registration rolls and past registration switch 13.

As illustrated in FIG. 3, the distance from the imaging station 18 on the photosensitive surface of drum 12 to the detack corotron 23 or point of transfer to the copy sheet 16 is approximately four inches. On the other hand, the distance from the registration rolls 14a, 14b to the detack corotron 23 station is approximately two inches. It should be noted that the distances used in this description are for illustrative purposes mainly and not to be taken as precise measurements. Therefore, to properly time the transfer of an image onto a copy sheet, allowance must be made for the approximately two inches additional travel that it takes the image on the photosensitive surface to travel to coordinate with the copy sheet 16 at the transfer station at detack corotron 23.

In operation, the following occurs. When the trailing edge of a copy sheet leaves the nip of the registration rolls 14a, 14b, the optics at the platen 30 will have scanned approximately two more inches than necessary to fill the copy sheet with an image. This extra two inches is wasted scanning time, both in the forward and reverse scanning cycles.

In accordance with the present invention, the scanning of documents is adjusted to compenste for this wasted scanning time. This is accomplished by measuring the length of the copy sheet for eacy copy run. The scanning distance is then adjusted for subsequent copies with the same copy sheet size.

In other words, it is wasted scan time to completely scan a large document, if only a small sized copy sheet is available. For example, in a 1:1 magnification ratio, only 14 inches of a 17 inch document can be transferred onto a 14 inch copy sheet. The efficiency of the machine is tailored to the copy sheet size. The size of the first copy sheet is measured and used to control the scanning cycle for subsequent copies.

The measurement of the copy sheet paper is accomplished in the following manner. The time period is measured beginning with the time that the copy feed is started by activating the registration rolls 14a, 14b until the registration switch 13 is deactuated by the trailing edge of the copy sheet paper. This time period is then related to the position of an image on the drum 12.

For example, with reference to FIG. 3, assume the copy sheet size is 10 inches and there is a timer or counter 50a providing a count for every 0.1 inch of paper. In other words, there will be 100 counts to measure 10 inches of paper. Also assume that there is two inches from the registration rolls 14a, 14b to the transfer station. Also, assume that the registration switch 13 is located 0.5 inch or five counts from the registration rolls 14a, 14b and that the lead edge of the copy sheet is in the nip of the registration rolls.

Since the registration switch 13 is $\frac{1}{2}$ inch from the registration rolls, 14a, 14b there is 9.5 inches of paper between the registration switch 13 and the trail edge of the copy sheet. Therefore, after the registration rolls are activated, there will be a count of 95 before the trailing edge reaches the registration switch 13.

For the first copy sheet, there will be a count of 95 indicating a 10 inch paper size, allowing for the five counts between the registration rolls and switch 13. During the first optic scan, however, the scanning carriage supporting the scanning mirrors will scan the complete length of the platen 30 until stopped in response to end of scan switch 33c or until stopped in response to the registration switch 13 sensing the trailing edge of the copy sheet. For a 10 inch copy sheet, the scan will be stopped in response to the registration switch 13. But an excess scan will have been made. It will be now necessary to adjust this scan so as to only scan the platen 30 for a time period equivalent to project an image within the borders of a 10 inch copy sheet.

In operation, the registration switch 13 is closed. The timing cycle is initiated by the scanning carriage activating start of scan switch 33a for 1:1 magnification ratios and activating start of scan switch 33b for a reduction ratio. The activation of the start of scan switch 33a starts the registration rolls 14a, 14b. It is again assumed that the lead edge of the copy sheet is in the nip of the registration rolls. The start of the registration rolls to drive the copy sheet to the transfer station begins the operation of a timer. The timer can be a hardware counter 50a as illustrated in FIG. 2, or any other suitable hardware or software timing device. The counter 50a will begin counting therefor in response to the activation of the registration rolls 14a, 14b.

For the first 10 inch copy sheet, the counter 50a will count to 95. The carriage, however, will have scanned the platen 30 for an additional 15 counts. The additional 15 counts represents the 1.5 inch difference of the copy sheet 16 relative to the drum surface. That is the difference between the 4 inches from the image area 18 to the transfer station and the 2.5 inches from the registration switch 13 to the transfer station. This additional scanning is wasted since it is putting an image beyond the trail edge of the copy sheet. This excess scanning time can be eliminated by stopping the scanning carriage at 95−15=80 counts on counter 50a after activation of registration rolls 14a, 14b. This is the scan time for subsequent copies after it has been determined that the copy sheet size is 10 inches.

The sequence is shown with reference to the flow chart of FIG. 4. The first decision block 100 queries the storing of the TX value. The TX value is the time from energizing the registration roll 14a clutch until the registration switch 13 deactivates at the trailing edge of the copy sheet.

If the TX value is not stored, the TX value is measured as illustrated in block 102. That is, the counter 50a counts the number of counts from the movement of the copy sheets from the registration switch until the trailing edge of the copy sheet. The scan is terminated illustrated in block 104 when the registration switch 13 is deactivated or the scan carriage reaches the end of scan switch 33c. The TX value is then stored in memory 50b shown in FIG. 2 as illustrated in block 106.

If the TX value is already stored, the copy sheet cassette is queried, block 108. If the cassette has not been changed, on the second scan, the TX value is retrived from memory, block 110. The magnification ratio is then queried, block 112. If in the normal 1:1 reduction, then we compute the normal scan time block 114 and run the copy for the computed scan time, block 116. For the case of a 10 inch copy sheet, the computer scan time as shown above is 95−15=80 counts. This is the count or scan time for stopping the scan carriage after initiating the start of scan switch. The TX value after each copy is stored in memory and if additional copies are to be made, the TX value is retrived and the cycle is repeated.

For a reduction ratio, there will be a slightly shorter scan time and increased speed of scan to reduce the image on the copy sheet. For a 0.67 reduction, onto a 10 inch copy sheet in a specific embodiment, the scan time or count was approximately 79.

The improved productivity in using the instant invention is illustrated in the charts shown in FIGS. 5 and 6. The charts represent the time in seconds for the first and subsequent copies of various reproduction runs.

In FIG. 5 the graph labelled "Prior Art System" for a 1:1 magnification ratio is set up to scan 17 inch documents. Typically the system will scan the entire 17" no matter the size of the copy sheets. The first chart shows the first time of making the first six copies. Of course, if smaller documents are reproduced, the standard 17 inch scan is followed.

The next four charts illustrate scanning according to the present invention. The numbers 17", 14", 11" and 10" represent copy sheet sizes. For 17 inch documents, it can be seen that the time of scan is identical to the first copy sheet but that the time of scan of the second copy sheet is slightly longer than using the standard system. The extra time is due to the fact that the second copy is delayed by approximately one-half second. This is basically the time difference of the trailing edge at the registration switch 13 and the trailing edge of the image on the drum. However, it can be seen that the third, fourth, fifth and sixth copies are produced at the same time as in the prior art system.

Moreover, when a 14 inch copy sheet is used, or 11 or 10 inch, a considerable time saving is observed. For example, with 10" copy sheets, six copies can be made in accordance with the present invention in the time it takes to make four copies in the prior art system.

The final four charts in FIG. 5 show scan time for subsequent runs. That is, after a run, it is assumed that the prior run has been made to set the timing and therefore for the second runs it is not necessary to measure the copy sheet and adjust the time of scan. This is evidenced by the fact that the second copy sheet takes less time than the second copy sheet of the first run. Again, there is seen a considerable time saving in using the present invention from the time taken in the prior art systems.

FIG. 6 illustrates the advantage of the invention in a reduction mode. Again, the top chart represents the 17 inch basic scan and the use of 8.5 inch copy paper. The next three charts show the first runs according to the present invention for 8.5", 8.27" and 8.00 copy sheets. It can be seen that six copies can be generated in less time to make five copies in the prior art system. Again, the bottom three charts represent subsequent runs and again there is an even greater saving in copy time. This is again due to the need for less time for the second copy because the timing has already been adjusted.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. In a reproduction machine having a scanning device for projecting images of documents onto a photosensitive surface, a copy sheet supply for providing sets of variable size copy sheets to receive the images from the photosensitive surface, registration rolls to drive the copy sheets into engagement with the photosensitive surface, a paper feed registration switch disposed near the drive rolls, and a counter, the counter responsive to the registration switch, the method of operating the reproduction machine including the steps of
   starting the scanning device for the first copy of a reproduction run,
   activating the registration rolls, the leading edge of a copy sheet being in the nip of the rolls, the copy sheet communicating with the registration switch,
   counting the time for the trailing edge of the copy sheet to reach the registration switch, the time being a function of the counts in the counter,
   terminating the scanning device,
   determining the time period for the scanning device for the next copy sheet to be reproduced in response to the length of the first copy sheet, including subtracting a given number from the count in the counter, starting the scanning device, and
   terminating the scanning device at the end of said time period.

* * * * *